United States Patent [19]

Borgmann

[11] Patent Number: 4,945,824
[45] Date of Patent: Aug. 7, 1990

[54] CAPPUCCINO MAKING ADAPTER FOR USE WITH COFFEE MAKERS

[75] Inventor: Michael Borgmann, Solingen, Fed. Rep. of Germany

[73] Assignee: Robert Krups Stiftung & Co. Kg., Solingen, Fed. Rep. of Germany

[21] Appl. No.: 360,331

[22] Filed: Jun. 2, 1989

[30] Foreign Application Priority Data

Dec. 15, 1988 [DE] Fed. Rep. of Germany ....... 3842206

[51] Int. Cl.$^5$ ............................................. A47J 31/40
[52] U.S. Cl. .................................... 99/293; 261/121.1; 261/DIG. 16; 261/DIG. 76
[58] Field of Search ................. 99/275, 279, 293, 294, 99/323.1, 323.2, 323.3; 261/121.1, DIG. 16, DIG. 76; 126/36.9, 369.1

[56] References Cited

U.S. PATENT DOCUMENTS

| | | | |
|---|---|---|---|
| 3,640,516 | 2/1972 | Willinger | 261/121.1 |
| 4,735,133 | 4/1988 | Paoletti | 99/323.1 |
| 4,735,135 | 4/1988 | Walker | 99/424 |
| 4,852,473 | 8/1989 | Azpitarte | 99/323.1 |

*Primary Examiner*—Robert W. Jenkins
*Attorney, Agent, or Firm*—Peter K. Kontler

[57] ABSTRACT

An adapter having an elastic body with a first inlet for the discharge end of a steam-supplying conduit, a second inlet for the discharge end of an air-supplying pipe, a mixing chamber into which air drawn by pressurized steam which is supplied by the conduit, and an outlet which discharges the mixture of air and steam into a supply of milk to thereby foam the milk so that foamed milk can be used as a topping for regular coffee or espresso coffee. The discharge end of the pipe and/or the discharge end of the conduit is held in the respective inlet exclusively by friction to facilitate ready separation of the body of the adapter. The intake end of the air-supplying pipe carries an elastic cap with one or more channels which supply atmospheric air into the pipe when the conduit supplies pressurized steam. The cap is removed prior to cleaning of the pipe and of the body of the adapter if the body is cleaned jointly with the pipe.

19 Claims, 2 Drawing Sheets

CAPPUCCINO MAKING ADAPTER FOR USE WITH COFFEE MAKERS

BACKGROUND OF THE INVENTION

The invention relates to machines for making hot beverages, especially to coffee making machines, and more particularly to improvements in adapters which can be used in conjunction with such machines for the preparation of cappuccino, i.e., espresso coffee or regular coffee with a topping of foamed or frothed milk.

An espresso making machine is normally provided with a conduit which serves to supply a stream of pressurized steam. Steam which is supplied by the conduit can be used to foam a supply of milk, such as a supply of hot milk in a cup or a similar vessel, for the purpose of using foamed milk as a topping for hot coffee or espresso in a regular cup or in a demitasse. The topping can be garnished with fragments of chocolate, ground coffee beans or in any other suitable way.

Published German patent application No. 36 44 519 discloses an adapter which has a rigid body provided with a first inlet for reception of a nozzle at the lower end of the steam-supplying conduit in an espresso making machine, a second inlet which receives the discharge end of an air supplying pipe, and an outlet which discharges a mixture of air and steam into a supply of milk in a suitable vessel. The flow of pressurized steam draws air by way of the pipe, and such air is supposed to be mixed with air prior to leaving the adapter by way of the outlet. The body of the adapter defines a relatively small mixing chamber which communicates with the two inlets and with the outlet and into which the inflowing pressurized steam draws an air stream by way of the air supplying pipe. An advantage of the just described adapter is that the internal surfaces of the body remain largely free of deposits of milk because pressurized steam normally prevents penetration of milk into the chamber by way of the outlet, even if the body of the adapter is fully immersed into milk. This is desirable because deposits of milk along the surfaces surrounding the mixing chamber, the inlets and/or the outlet could adversely influence the rate of inflow of air and steam as well as the rate of outflow of steam-air mixture and could reduce the effective volume of the mixing chamber.

The body of the adapter which is described in the published German patent application is a separately produced part which is connected to the nozzle at the lower end of the steam-supplying conduit. Such body resembles a funnel and is secured to a conical nozzle at the lower end of the steam-supplying conduit. As a rule, the body is bonded to the steam-supplying conduit by a suitable adhesive so that the conduit and the adapter constitute an integral unit. A separately produced adapter is preferred because this enables the manufacturer to make the steam-supplying conduit of a first material which is best suited for repeated contact with steam, and to make the body of the adapter of a second material, e.g., a material which is less likely to gather layers of incrustated milk. Moreover, the shape of a separately produced adapter body can be selected practically at will.

A drawback of the aforedescribed adapter is that it is permanently affixed to the steam supplying conduit. This not only necessitates the use of a suitable adhesive but also renders it necessary to select the materials of the steam-supplying pipe and of the adapter body with a view to ensure that they can be reliably bonded to each other. In addition, the application and setting of adhesive take up much time to thus prolong the assembly of the adapter with the coffee making machine. Still further, it is rather difficult to adequately clean the adapter for the purpose of removing eventual deposits of milk, and the adapter draws air at times when mixing of air with steam is not desirable or necessary. It is especially difficult to adequately clean the internal surfaces surrounding the mixing chamber and the outlet because the body of the adapter is permanently affixed to the steam-supplying conduit.

Paoletti U.S. Pat. No. 4,735,133 discloses a milk emulsifying device wherein milk, air and steam are mixed in a vacuum chamber. A drawback of the patented device is that its interior is invariably contaminated with milk whenever the device is put to use.

Commonly owned U.S. patent applications Ser. Nos. 205,114 (filed June 9, 1988) and 242,715 (filed Sept. 9, 1988) disclose a cappuccino making adapter which is more or less permanently affixed to the steam-supplying conduit of an espresso maker or a like machine. The adapter is equipped with a valve which can prevent admission of air when steam issuing from the conduit is to be used for purposes other than frothing milk. The adapter comprises a substantial number of parts.

OBJECTS OF THE INVENTION

An object of the invention is to provide an adapter which can be used in lieu of heretofore known adapters and is less expensive and easier to clean than a conventional adapter.

Another object of the invention is to provide an adapter which can be repeatedly secured to or detached from a steam-supplying conduit without any tools.

A further object of the invention is to provide an adapter wherein penetration of impurities into the mixing chamber is prevented, or the likelihood of such penetration reduced, in a simple and inexpensive manner.

An additional object of the invention is to provide a novel and improved combination of an adapter and an air-supplying conduit.

Still another object of the invention is to provide a novel and improved combination of a coffee maker (especially an espresso making machine) and an adapter of the above outlined character.

A further object of the invention is to provide a novel and improved device for facilitating cleaning of the above outlined adapter while the body of the adapter remains attached to the air-supplying conduit.

An additional object of the invention is to provide an adapter which can be repeatedly and sealingly secured to a steam-supplying conduit without an adhesive.

SUMMARY OF THE INVENTION

The invention is embodied in a cappuccino making adapter which can be used with a coffee making machine of the type having a steam-supplying conduit with an end portion which discharges pressurized steam. The improved adapter comprises an at least partially elastic body which can be made of a single piece of rubber or a suitable plastic material and is immersible, at least in part, into a supply of liquid, particularly hot milk. The body of the adapter has a steam-admitting first inlet which is connectable with the steam-supplying conduit, and air-admitting second inlet, a chamber which communicates with the inlets for the establishment of a steam-air mixture therein, and an outlet which serves to discharge the steam-air mixture into the supply of liquid.

The at least partially elastic body of the adapter has a portion which surrounds the first inlet and is dimensioned to sealingly receive the steam-discharging end portion of the steam-supplying conduit.

The body of the adapter can be furnished with an air-supplying second conduit having an intake end and a discharge end. The body of such adapter preferably includes a second portion which surrounds the second inlet and is dimensioned to sealingly receive the discharge end of the second conduit.

A removable closure can be provided for the intake end of the second conduit. Such closure can include or constitute an elastic cap which surrounds the intake end of the second conduit and has at least one channel to establish communication between the atmosphere and the interior of the second conduit. The cap remains on the intake end of the second conduit when the adapter is in use, i.e., when the body of the adapter is at least partially immersed into a supply of milk and the steam-supplying conduit supplies pressurized steam which draws into the mixing chamber air by way of the channel or channels in the cap on the intake end of the second conduit). The person in charge of cleaning the adapter and the second conduit can remove the cap when the adapter is not in use so as to permit more convenient and more thorough cleaning of the cap and of the body by a spray of hot water or steam.

The body of the adapter is preferably configured in such a way that it has a first end face and a second end face opposite the first end face. At least one of end faces is or can be flat, the inlets are provided in the first end face, and the outlet is provided in the second end face. A relatively thick end wall of the body of the adapter is located between the first end face and the chamber, and a relatively thin sidewall of the body surrounds the chamber and the outlet. The thickness of the sidewall can be a small or minute fraction of the thickness of the end wall. The sidewall can taper in a direction from the end wall toward the second end face of the body.

The second conduit can constitute a straight piece of metallic or plastic pipe of requisite length to ensure that the intake end is located above the supply of liquid when the body is immersed into such supply so that the outlet discharges the mixture of air and steam into the liquid at an optimum distance from the upper surface of the supply.

The steam-supplying conduit delivers a flow of steam at a pressure which suffices to ensure that steam which enters the chamber draws air by way of the channel or channels in the cap at the intake end of the second conduit as well as that the mixture which is formed in the chamber leaves the body by way of the outlet to foam or frothe the supply of liquid.

The cross-sectional area of the first inlet is or can be greater than the cross-sectional area of the second inlet, and the cross-sectional area of the outlet is or can be greater than the cross-sectional area of the second inlet. The outlet is preferably located opposite the first inlet, and the second inlet is preferably adjacent one side of the first inlet. The outlet is preferably located at a level beneath the inlets when the body of the adapter is immersed into a supply of liquid. The inlets can constitute two substantially parallel holes in the end wall of the elastic body of the adapter.

The novel features which are considered as characteristic of the invention are set forth in particular in the appended claims. The improved adapter itself, however, both as to its construction and the mode of using and cleaning the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
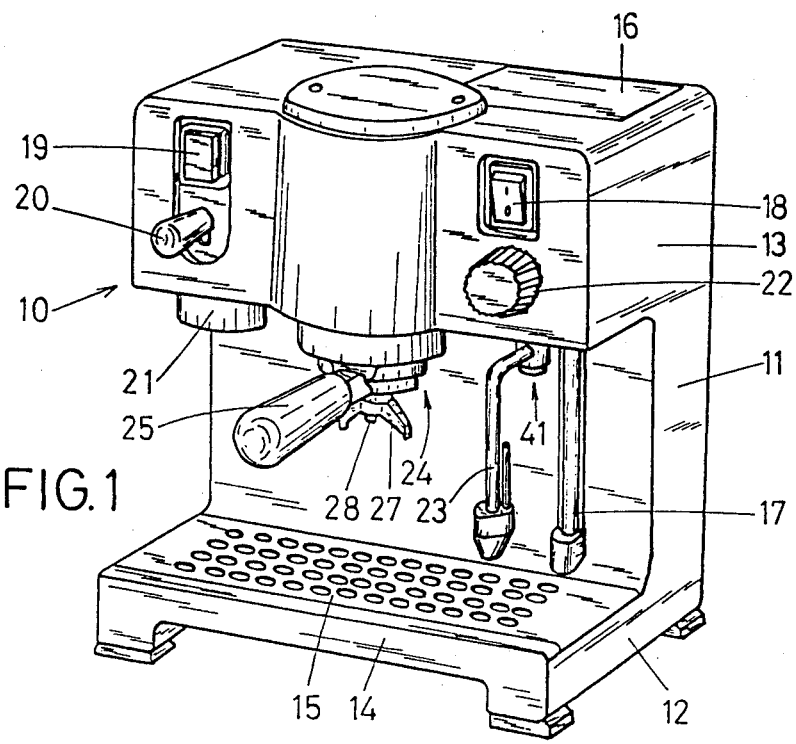
FIG. 1 is a schematic perspective view of a coffee making machine and of an adapter which embodies one form of the invention and is separably attached to the lower end portion of a steam-supplying conduit.

FIG. 1 shows only those parts of an espresso making machine 10 which are necessary for full understanding of the invention. For example, FIG. 1 does not show the components of the electric circuitry including means for heating water to generate steam, the container for a supply of fresh water and/or the details of the holder for ground coffee. The non-illustrated components are or can be identical with those in conventional coffee making machines, e.g., in machines which are distributed by the assignee of the present application and are known as "Espresso Plus" #966 and "Espresso Mini" #963.

The machine 10 of FIG. 1 comprises an upright housing 11 which has a base or leg 12 supporting a liquid collecting trough 14 beneath an apertured plate 15 serving as a support for one or more cups or demitasses. The trough 14 and/or the plate 15 can be detached from the base 12 for convenient disposal of accumulated liquid and/or for convenience of cleaning of the base 12, plate 15 and trough 14. The base 12 is placed onto a table, a counter or any other support when the machine is in use. The cable which connects the machine 10 with a source of electrical energy is not shown in the drawing.

The upper portion 13 of the housing 11 is spaced apart from and overlies the plate 15. The top wall of the housing portion 13 has a detachable or pivotable lid 16 which affords access to a container for fresh water. The arrangement is preferably such that the container can be withdrawn from the housing 11 when the lid 16 is removed or lifted. This renders it possible to hold the open upper end of the container beneath a faucet to replenish the supply of fresh water therein. A depressible, foldable or otherwise concealable handle of the fresh water container serves to facilitate extraction of the container from the housing 11, its reinsertion into the housing as well as its manipulation outside of the housing. A water level indicator comprises an upright pipe 17 the lower end of which communicates with the lower portion of the properly inserted fresh water container. The pipe 17 is suitably graduated to indicate the quantity of fresh water in the container. For example, the graduations can indicate the number of cups or demitasses which can be filled with espresso coffee made from the confined supply of fresh water. The liquid level indicator is installed beneath the upper portion 13 of the housing 11 so that the graduations of the pipe 17 are readily observable but that the pipe is adequately shielded from contact with foreign objects.

The front wall of the upper housing portion 13 carries an electric on-off switch 18 which can connect the current consuming components of the machine 10 with an energy source by way of the aforementioned cable. The switch 18 is installed in one end portion of the front wall of the housing portion 13, and the other end of such front wall supports a lamp 19 or another suitable signal generating device which serves to indicate the temperature of heated water. The arrangement may be such that the lamp 19 lights up when the switch 18 is on and, the lamp continues to emit light until the temperature of heated water reaches a predetermined value.

A metering lever 20 beneath the lamp 19 serves to admit coffee (e.g., espresso coffee) into one or more cups or other vessels on the apertured plate 15. The details of parts which are operatively connected with the lever 20 are known and need not be described here.

The upper portion 13 of the housing 11 carries a substantially cylindrical espresso tamper 21 wherein a supply of ground (e.g., pulverulent) coffee beans is compacted in a suitable filter, again in a manner forming no part of the present invention.

The switch 18 is installed at a level above a rotary steam regulating knob 22 which can be turned by hand between a first end position in which it prevents the outflow of steam by way of an arcuate steam-supplying conduit 23, and a second end position in which the conduit 23 can supply pressurized steam at a maximum rate. The knob 22 can be caused to assume a practically infinite number of intermediate positions to thus permit evacuation of steam at the maximum rate or at any one of a number of lesser rates. A coupling 41 for the upper end portion of the steam-supplying conduit 23 is preferably designed in such a way that the lower end portion 40 of the conduit can be moved along an arcuate path to a position above the apertured plate 15 or to a position adjacent the front side of the intermediate portion of the housing 11 beneath the upper portion 13.

Steam which is supplied by the conduit 23 can be used to foam or frothe a supply of milk in a manner to be described with reference to FIG. 2, or to preheat the cup or cups on the plate 14 prior to admission of hot coffee.

The machine 10 further comprises a conventional filter carrier or holder 24 which is supported by the upper housing portion 13 between the switch 18 and lamp 19 and defines a chamber for a sieve. The chamber is surrounded by a material (such as metal) having a pronounced thermal conductivity, and the holder 24 is located at a level above a handle 25 of a material which is a poor conductor of heat so that it can be readily engaged by hand when the housing 10 contains hot water and steam. A connector between the handle 25 and holder 24 carries two nozzles 27 for hot coffee; such nozzles are secured to the connector by a screw 28 or another suitable fastener. A bayonet mount (not specifically shown) is employed to separably secure the holder 24 to the upper portion 13 of the housing 11.

In accordance with a feature of the invention, the enlarged lower end portion or nipple 26 (FIG. 2) of the steam-supplying conduit 23 is separably connectable with a novel and improved adapter 35 which enables the machine 10 to make cappuccino. More specifically, the adapter 35 can be used to foam a supply of liquid 134 (e.g., hot milk) in a vessel 34 so that the foamed liquid can be poured on top of regular coffee or espresso coffee in a cup or demitasse which has been removed from the apertured plate 15.

The adapter 35 has a body which is made of or contains rubber or an elastomeric plastic material capable of withstanding elevated temperatures and exhibiting a certain amount of elasticity to permit repeated attachment to or detachment from the lower end portion 26 of the steam-supplying conduit 23. The body of the adapter 35 has a relatively thick upper end wall 45 between an upper end face 42 and an internal mixing chamber 36, a lower end face 43 opposite the upper end face 42, a first inlet 40 which removably receives the end portion 26 of the conduit 23, a second inlet 41 which removably receives the air-discharging end 32 of a straight air-supplying conduit 30, a substantially conical sidewall 44 which tapers toward the lower end face 43, and an outlet 37 which is provided in the lower end face 43 substantially opposite the inlet 40. The inlets 40 and 41 are two parallel holes which extend through the end wall 45 between the upper end face 42 and the chamber 36 of the body of the adapter 35. The thickness of the sidewall 44 of the illustrated adapter 35 is a small fraction of the thickness of the end wall 45, the cross-sectional area of the inlet 40 is greater than that of the inlet 41, and the cross-sectional area of the inlet 41 is smaller than that of the outlet 37. The reference character 31 denotes the intake end of the air-supplying conduit 30. The latter can constitute a piece of metallic or plastic pipe having a length which suffices to ensure that the intake end 31 is located above the supply of liquid 134 in the vessel 34 when the adapter 35 is in actual use, even if the body of the adapter is immersed to such an extent that the lower end wall 43 is closely or practically immediately adjacent the bottom wall of the vessel 34.

At least those portions of the body of the adapter 35 which surround the inlets 40 and 41 are sufficiently elastic and are dimensioned in such a way that the enlarged lower end portion 26 of the conduit 23 can be sealingly received in the inlet 40 and is retained in the inlet 40 with a requisite force to prevent accidental separation of the adapter from the conduit 23, and that the discharge end 32 of the air-supplying conduit 30 is sealingly received in the inlet 41 and is retained therein with a force which prevents accidental separation of the body of the adapter from the conduit 30.

Figure 2:
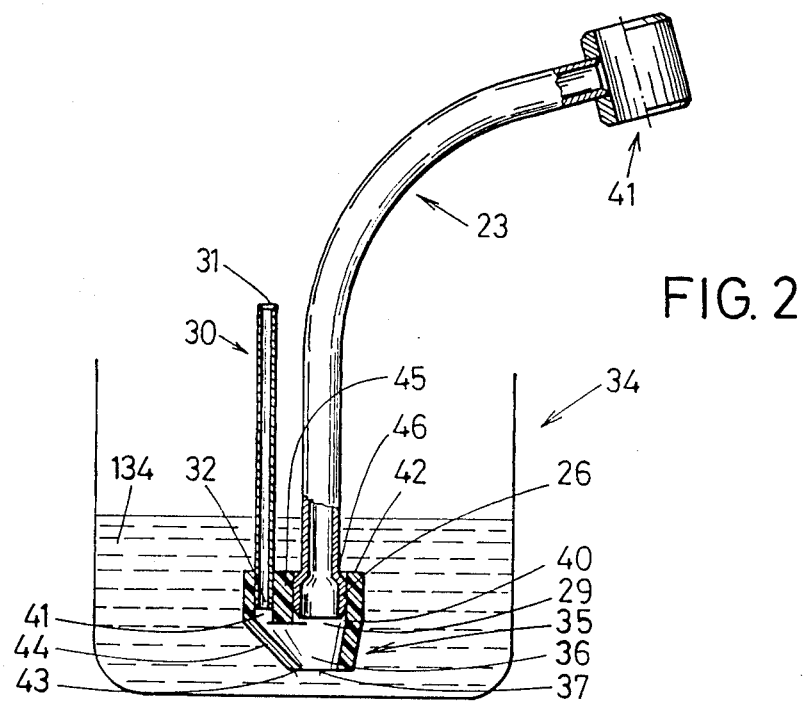
FIG. 2 is an enlarged partly elevational and partly sectional view of the steam-supplying conduit and of the adapter, and further showing a vessel for a supply of liquid into which the body of the adapter is immersed.

As can be readily seen in FIG. 2, the conicity of the sidewall 44 of the body of the adapter 35 need not be uniform all the way around the chamber 36 and outlet 37. The portion of maximum conicity is located beneath the inlet 41 so that it can deflect inflowing air toward the path of steam on its way through the chamber 36 and into the outlet 37. The conduit 30 supplies air into the adapter 35 as a result of suction which is generated in the chamber 36 by the flow of steam on its way from the inlet 40 (i.e., beyond the lower end face 29 of the end portion 26) toward the outlet 37.

The elastic body of the one-piece adapter 35 can be attached to and detached from the conduit 23 and/or 30 as often as desired. The relatively thick end wall 45 enhances the stability of the adapter 35 and contributes to reliable retention of the end portion 26 in the inlet 40 exclusively by friction (i.e., without the need for an adhesive or for any other more or less permanent connection between the parts 35 and 23) as well as to equally reliable retention of the discharge end 32 of the conduit 30 in the inlet 41, again exclusively by friction. However, it is also within the purview of the invention to establish a more or less permanent connection between the body of the adapter 35 and the respective end 32 of the conduit 30. Since the end wall 45 is relatively thick, the inlets 40, 41 are relatively long and, therefore, the area of contact between the conduits 23, 30 on the one hand, and the body of the adapter 35 on the other hand, is sufficiently large to ensure reliable frictional retention of the conduit 30 and adapter 35 in the positions which are shown in FIG. 2 without the need for an adhesive, a thread, a bayonet mount or the like.

The elastic body of the adapter 35 further ensures that the end portion 26 of the conduit 23 can be sealingly received in the inlet 40 and that the discharge end 32 of the conduit 30 can be sealingly received in the inlet 41 without the need for O-rings and/or other discrete sealing elements.

The enlarged lower end portion 26 and the adjacent intermediate portion of the steam-supplying conduit 23 define an annular shoulder 46. The end portion 26 is preferably inserted into the inlet 40 to such an extent that the material of the end wall 45 overlies the shoulder 46 in the region of the upper end face 42. This contributes to the sealing and retaining action of the end wall 45. The lower end of the conduit 30 can also define an annular shoulder in order to ensure more reliable retention in the inlet 41. However, and since the conduit 30 supplies air at room temperature, the sealing action of the end wall 45 upon the lower end 32 of the conduit 30 need not be as pronounced as that upon the lower end portion 26 of the steam-supplying conduit 23.

The coupling 41 at the upper end of the conduit 23 can form part of a bayonet mount. However, the conduit 23 can be connected to the machine 10 in any other suitable way without departing from the spirit of the invention.

The adapter 35 will be detached from (i.e., slipped off) the lower end portion 26 of the steam-supplying conduit 23 when the adapter and/or the conduit 30 require cleaning, e.g., with hot water or with steam. Furthermore, the adapter 35 will be detached from the conduit 23 when the latter is to supply hot steam for the purpose of preheating cups, demitasses or other types of receptacles which are to receive freshly brewed hot coffee or espresso coffee. Still further, the adapter 35 can be detached from the conduit 23 when the machine 10 is not used for the making of cappuccino.

Figure 3:
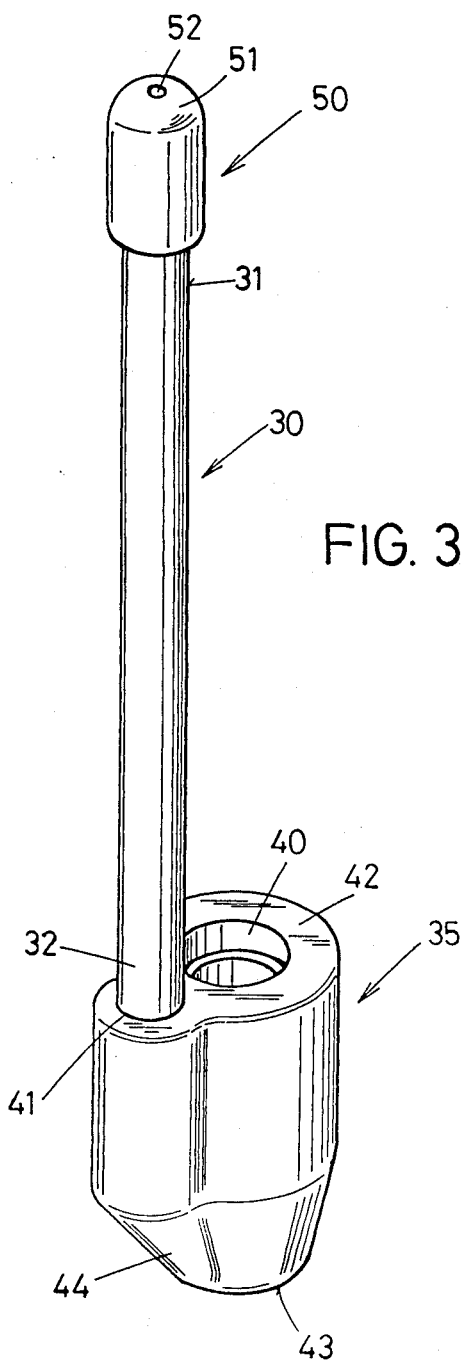
FIG. 3 is an enlarged perspective view of the adapter and of the air-supplying second conduit with an elastic cap which is applied over the intake end of the conduit.

FIG. 3 shows that the upper end 31 of the air-supplying conduit 30 can be partially closed by a closure in the form of a preferably elastic cap 50 which is simply slipped onto the upper end 31 and has a concavo-convex top wall 51 with one or more relatively narrow channels 52 (FIG. 3 shows a single centrally located channel 52) for admission of requisite quantities of air when the adapter 35 is in actual use. The cap 50 ensures that the conduit 30 cannot convey into the mixing chamber 36 large particles of solid impurities. Nevertheless, the channel or channels 52 ensure admission of requisite quantities of air which is mixed with steam in the chamber 36 prior to leaving the body of the adapter 35 by way of the outlet 37.

The cap 50 is slipped off the respective end 31 of the conduit 30 when the latter is to be cleaned. This renders it possible to direct a large stream of hot water or steam into the conduit 30 and thence into the chamber 36 in order to facilitate expulsion of impurities including incrustations of milk, if any.

The material of the cap 50 may but need not be the same as that of the body of the adapter 35.

The operation of the improved adapter 35 is as follows:

The machine 10 is manipulated in the customary way so that it produces a supply of steam which can be admitted into the conduit 23 via coupling 41 in response to turning of the knob 22 from its sealing position. At such time, the body of the adapter 35 is already attached to the end portion 26 of the conduit 23, and the lower end 32 of the conduit 30 extends into the inlet 41.

At least the lower portion (e.g., at least a portion of the sidewall 44) of the body of the adapter 35 is immersed into the supply 134 of milk in the vessel 34 of FIG. 2 before the knob 22 is manipulated (after the light 19 has been automatically turned off to indicate that the housing 11 confines an adequate supply of pressurized steam) to admit steam into the conduit 23. Such steam flows into the chamber 37 and creates suction to draw air by way of the conduit 30. The inflowing air is mixed with hot steam and the resulting mixture leaves the chamber 36 by way of the outlet 37 to thereby foam or froth the supply of milk 134 in the vessel 34. Thus, the vessel 34 then contains a mixture of milk, air and steam. Such mixture can be used as a topping for regular or espresso coffee to form so-called cappuccino coffee.

It has been found that the mixture which develops in the chamber 36 prevents penetration of milk into the interior of the body of the adapter 35 so that the accumulation of hardened layers of milk around the outlet 37, around the chamber 36, in the lower end 32 of the conduit 30 and/or in the lower end portion 26 of the conduit 23 is highly unlikely or plain impossible. Therefore, the adapter 35 and the conduit 30 do not require frequent cleaning. If a cleaning is desired anyway, the end wall 45 of the adapter 35 is slipped off the end portion 26 of the conduit 23 (after the knob 22 has been turned to assume its sealing position), and the cap 50 is preferably slipped off the respective end 31 of the conduit 30 to facilitate the flow of relatively large quantities of a cleaning fluid (e.g., hot water or steam) through the conduit 30, chamber 36 and outlet 37. When the cleaning operation is completed, the end portion 26 of the conduit 23 is reintroduced into the inlet 40 and the adapter 30 is ready for renewed use. The operator does not run the risk of misplacing or losing one or more sealing elements because the portion of the end wall 45 around the inlet 40 serves as a means for sealingly engaging the end portion 26 of the steam-supplying conduit 23 while permitting separation of the adapter 35 when the need for separation arises.

The illustrated machine 10 is but one of numerous machines which can be put to use with the adapter 35 and conduit 30 of the present invention. All that counts is that the machine be equipped with steam generating means and with a conduit which supplies pressurized hot steam and can be sealingly introduced into the inlet 40 of the illustrated adapter or an analogous adapter.

An important advantage of the improved adapter 35 is its simplicity. Thus, the adapter can be mass-produced in existing machines and can be securely but separably affixed to the end portion 26 of the conduit 23 and/or to the adjacent end 32 of the conduit 30. The latter can be mass-produced by subdividing a relatively thin pipe into sections of desired length. The locus of the inner end of the inlet 41 relative to the locus of the inner end of the inlet 40 is preferably selected in such a way that steam issuing from the end portion 26 of the conduit 23 can flow around the inner end of the inlet 41 to thus enhance the mixing of air and steam in the chamber 36. The inclination of a portion of the sidewall 44 can be readily selected in such a way that air entering via inlet 41 is reliably guided into the main flow of steam between the inlet 40 and the outlet 37 to thereby further enhance the mixing of air and steam before the resulting mixture enters the supply of milk 134 in the vessel 34.

Another important advantage of the improved adapter is that it need not be permanently bonded or otherwise affixed to the conduit 30 and/or 23. The absence of a permanent bond does not result in leakage of steam from the end portion 26 of the conduit 23 or from the chamber 36 via inlet 40 and/or 41. In addition, a mere frictional engagement between the surface bounding the relatively long inlet 41 and the end portion 32 of the conduit 30 suffices to ensure the admission of a requisite quantity of air via channel or channels 52 in the cap 50 and the interior of the conduit 30.

A further important advantage of the improved adapter 35 is that it can be readily cleaned, with or without the conduit 30, and that it can be rapidly and reliably reattached to the end portion 26 of the conduit 23.

The improved adapter 35 can be used with a varity of coffee making machines, i.e., it is not necessary to design a special machine for the express purpose of using it with the adapter of the present invention.

An additional important advantage of the improved adapter 35 is that it does not require frequent cleaning because the flow of steam which is admitted via conduit 23 suffices to ensure that milk will not penetrate into the chamber 36 when the adapter is in actual use. The cap 50 reduces the likelihood of penetration of relatively large impurities into the conduit 30 and thence into the chamber 36 and into the supply of liquid in the vessel 34 or another suitable vessel for the liquid which is to be foamed as a result of admission of an air-steam mixture.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. For use with a coffee making machine having a steam-supplying conduit, a cappuccino making adapter comprising an elastic body immersible into a supply of milk and having a steam-admitting first inlet directly connectable with the steam-supplying conduit, an air-admitting second inlet, a chamber which communicates with said inlets for the establishment of a steam-air mixture, and an outlet for discharging the mixture into the supply of milk.

2. The structure of claim 1, for use with a coffee making machine having a steam-supplying conduit with a steam-discharging end portion, wherein said body includes a portion surrounding said first inlet and dimensioned to sealingly receive the end portion of the steam-supplying conduit.

3. The structure of claim 2, further comprising an air-supplying second conduit having an intake end and a discharge end, said body having a second portion surrounding said second inlet and dimensioned to sealingly receive the discharge end of said second conduit.

4. The structure of claim 3, further comprising a removable closure for the intake end of said second conduit.

5. The structure of claim 4, wherein said closure includes an elastic cap which surrounds the intake end of said second conduit.

6. The structure of claim 5, wherein said closure has at least one channel which establishes communication between the atmosphere and the interior of said second conduit.

7. The structure of claim 1, wherein said body consists of a single piece of elastomeric material.

8. The structure of claim 1, wherein said body has a first end face and a second end face opposite said first end face, said inlets being provided in said first end face and said outlet being provided in said second end face.

9. The structure of claim 8, wherein said body has an end wall between said chamber and said first end face and a sidewall surrounding said chamber and said outlet, said inlets extending through said, end wall.

10. The structure of claim 9, wherein said end wall has a first thickness and said sidewall has a second thickness which is a fraction of said first thickness.

11. The structure of claim 9, wherein said sidewall tapers in a direction from said end wall toward said second end face.

12. The structure of claim 1, further comprising a substantially straight air-supplying second conduit having an intake end and a discharge end sealingly received in said second inlet.

13. The structure of claim 12, wherein said second conduit is a piece of pipe.

14. The structure of claim 1 for use with a coffee making machine having a conduit for supplying pressurized steam, further comprising a second conduit having an intake end and a discharge end sealingly received in said second inlet to admit into said chamber atmospheric air which is drawn into said intake end as a result of admission of pressurized steam into said chamber.

15. The structure of claim 1, wherein the cross-sectional area of one of said inlets is greater than the cross-sectional area of the other of said inlets.

16. The structure of claim 1, wherein the cross-sectional area of said outlet is greater than the cross-sectional area of one of said inlets.

17. The structure of claim 1, wherein said inlets are adjacent one another and said outlet is located at a level beneath said inlets when said body is immersed into a supply of milk.

18. The structure of claim 1, wherein said body includes an end wall adjacent said chamber and having two substantially parallel through holes constituting said inlets.

19. The structure of claim 1, wherein said first inlet is located opposite said outlets and said second inlet is adjacent one side of said first inlet.

* * * * *